United States Patent [19]

Postigo

[11] Patent Number: 4,764,074
[45] Date of Patent: Aug. 16, 1988

[54] PALLET LOADING APPARATUS

[76] Inventor: Joseph Postigo, 878 Place Sardaigne, Brossard, Quebec, Canada, J4X 1L7

[21] Appl. No.: 20,514

[22] Filed: Mar. 2, 1987

[51] Int. Cl.$^4$ ............................................. B65G 57/30
[52] U.S. Cl. ........................................ 414/95; 414/36; 414/82; 414/127
[58] Field of Search ...................... 414/36, 41, 82, 95, 414/126, 127, 130

[56] References Cited

U.S. PATENT DOCUMENTS 3,151,753 10/1964 Verrinder et al. .
3,190,466 6/1965 Hostetler .
3,269,565 8/1966 Kemp, Jr. .
3,363,781 1/1968 Magnetti .
3,442,400 5/1969 Roth et al. .
4,212,579 7/1980 Strömberg ............................ 414/95
4,632,620 12/1986 Wiggers ................................ 414/95

FOREIGN PATENT DOCUMENTS 0205146 12/1983 German Democratic Rep. ... 414/95

Primary Examiner—Robert J. Spar
Assistant Examiner—Janice Krizek
Attorney, Agent, or Firm—Robic, Robic & Associates

[57] ABSTRACT

An apparatus for placing a load of stacked articles on a pallet. This apparatus comprises a conveyor having a series of spaced rollers and a bridge structure spanning the conveyor. Two load lifting structures hang vertically from the bridge structure, one on each side of the roller conveyor, and are displaceable toward and away from one another over the conveyor. Each lifting structure has a lifting frame formed of a vertical ram wall, a tine carrier at the lower end of the ram wall, and an operating base supporting the tine carrier during its displacement. The pallets are fed from a pallet unstacker delivering one pallet at a time on a pallet conveyor extending at a right angle from the roller conveyor. The pallets are fed onto the roller conveyor when the ram walls and tines of the load lifting frames are lifted above the roller conveyor a distance sufficient to allow insertion of the pallet. The load between the lifting frames is then lowered onto the pallet. The tines are removed from beneath the load while the ram walls are still against the load and the ram walls are finally moved away laterally from the load.

12 Claims, 12 Drawing Sheets

PALLET LOADING APPARATUS

BACKGROUND OF THE INVENTION

1. Field of the Invention

The present invention relates to a pallet loading apparatus and more specifically to an apparatus capable of placing a load of stacked articles onto a pallet by providing for the lifting of the load, slipping of the pallet beneath the load when raised and lowering of the load onto the pallet, all in conjunction with a roller conveyor intended to carry the load away.

By a load of stacked articles is to be understood any stacked boxes containing food or other products, bottles, bundles of cardboard blanks or any similar articles that can be stacked one over the other with the stacks arranged side by side into a plurality of adjoining piles; the load including a flat support sheet of heavy cardboard or the like for bringing the piles to the pallet-loading apparatus.

2. Description of the Prior Art

Pallets are extensively used in processing plants for handling various types of products, bundled together or disposed in cases, from one place to another. An object of the present invention is to provide a pallet-loading apparatus that is efficient, easy to build and to operate and that provides for quickly disposing a load onto a pallet.

Before preparing the present application, a search of the prior art was made which has revealed the following U.S. Pat. Nos.:

3,151,753—Oct. 6, 1964
3,190,466—June 22, 1965
3,269,565—Aug. 30, 1966
3,363,781—Jan. 16, 1968
3,442,400—May 6, 1969.

In U.S. Pat. No. 3,151,753, a machine is described which is used, among other things, for loading articles on pallets. The articles to be loaded are brought by a first conveyor to a stacker unit including a fork which may either be raised or lowered at will by a power cylinder. When the desired stack of articles is obtained, it is transferred by a second conveyor to the location of and in facing relation with a ram which, when actuated, simply slides the stack from the second mentioned conveyor onto the surface of a pallet.

U.S. Pat. No. 3,190,466 discloses a machine for stacking and unstacking bins comprising two vertical racks on opposite sides of a conveyor. A lifting mechanism is provided on each rack and these mechanisms serve to grip the second to last one of the stacked bins and raise them so as to allow the last bin, resting on the conveyor, to be removed. Stacking is achieved by reversing the operation. U.S. Pat. No. 3,363,781 describes a similarly operating machine which serves to stack bricks onto pallets.

As to U.S. Pat. No. 3,269,565, it relates to a machine for transferring a load from one pallet to another. According to this patent, a load which has already been placed on a pallet is moved to the center of the machine. A fork then comes to grip the load to allow the pallet to be withdrawn and eliminated. Simultaneously, a replacement pallet is slid by a ram and transferred beneath the load, the fork being then lowered so that the load be placed on the replacement pallet. The fork is then removed and the load and pallet moved away from the center of the machine.

Finally, U.S. Pat. No. 3,442,400 is concerned with an apparatus for stacking cartons and, if need be, for laying the thus stacked cartons onto a pallet. In operation, two forks are provided on opposite sides of an elevator frame that can be moved vertically. A first layer of cartons to be stacked, brought by the main conveyor, is lifted by the elevator frame up to the level of the forks which are then brought beneath the layer to hold it while the elevator frame moves down to pick up a second layer and raise it, in turn, at the level of the forks to be held thereby.

While the various patents briefly analyzed above are drawn toward devices for handling stacks of articles, none discloses an apparatus specifically intended to place a pallet beneath a stack of articles in a manner and with means providing a more efficient and quicker operation and at a lower cost than the structures of above noted prior art.

SUMMARY OF THE INVENTION

More specifically, the invention is essentially an apparatus for placing a load of stacked articles on a pallet comprising a conveyor having a series of spaced rollers and a bridge structure spanning the conveyor. Two load lifting structures hang vertically from the bridge structure, one on each side of the roller conveyor, and are displaceable toward and away from one another over the conveyor. Each lifting structure has a lifting frame formed of a vertical ram wall, of a tine carrier at the lower end of the ram wall, the tines of the carrier having tines disposed to be inserted in and withdrawn from spaces between the rollers of the conveyor, and of an operating base supporting the tine carrier during its displacement and being secured to the lower end of the ram wall. The pallets are fed from a pallet unstacker delivering one pallet at a time on a pallet conveyor extending at right angles from the roller conveyor. The pallet conveyor has a pallet delivery portion in the form of a chain conveyor of which endless chain portions travel between rollers of the roller conveyor with their upper strands projecting slightly above the conveyor rollers. The pallets are fed onto the roller conveyor when the ram walls and tines of the load lifting frames are lifted above the roller conveyor a distance sufficient to allow insertion of the pallet. The load between the lifting frames is then lowered onto the pallet; the tines removed from beneath the load while the ram walls are still against the load and thereafter the ram walls are moved away laterally from the load.

A description now follows of a preferred embodiment of the invention having reference to the appended drawings:

BRIEF DESCRIPTION OF THE DRAWINGS

FIG. 11 is a side elevation view of the mechanism of FIG. 10 shown in inoperative position while

DESCRIPTION OF THE PREFERRED EMBODIMENT

Figure 1:
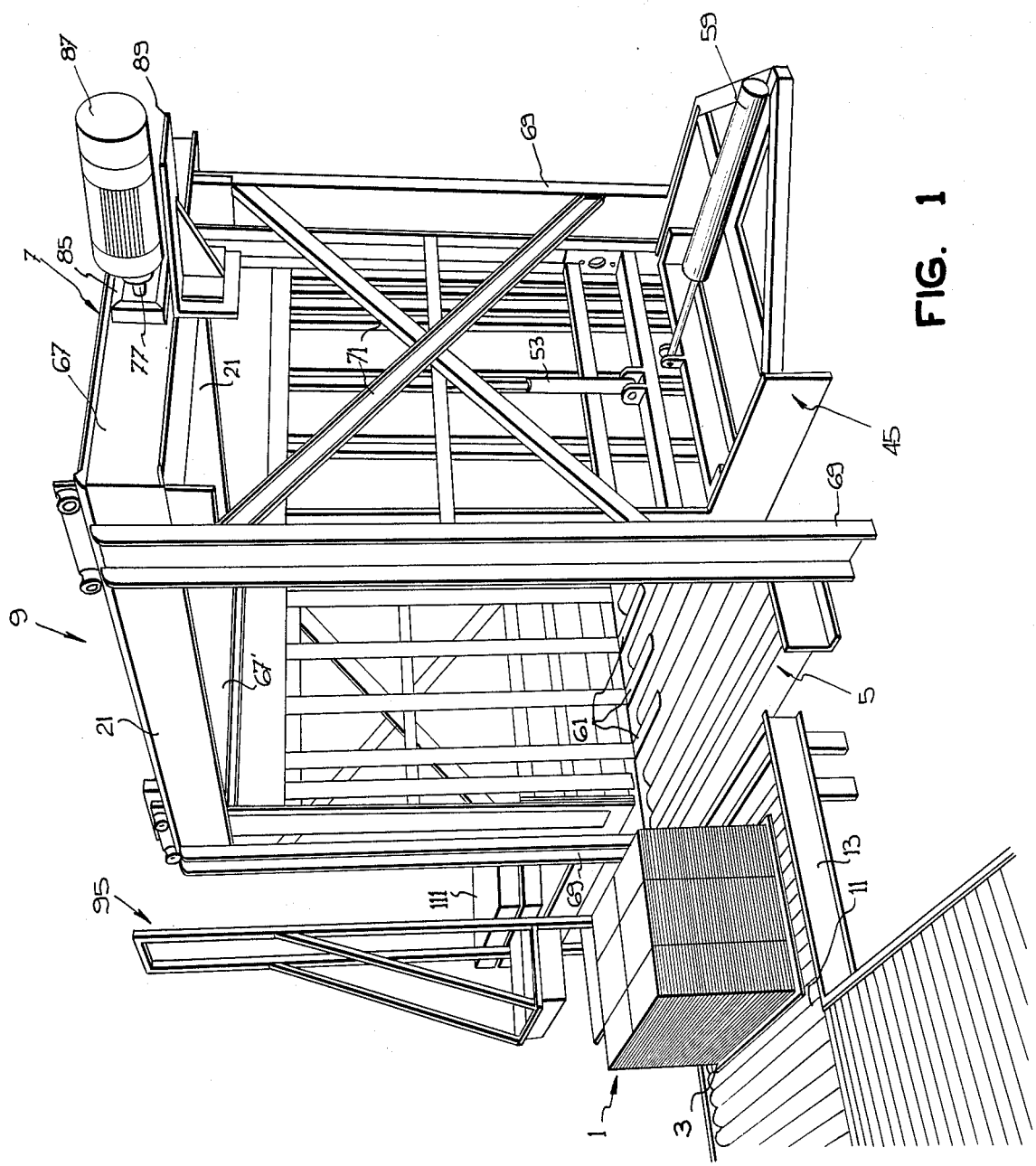
FIG. 1 is a perspective view of a pallet loading apparatus made according to the teaching of the invention.
Figure 2:
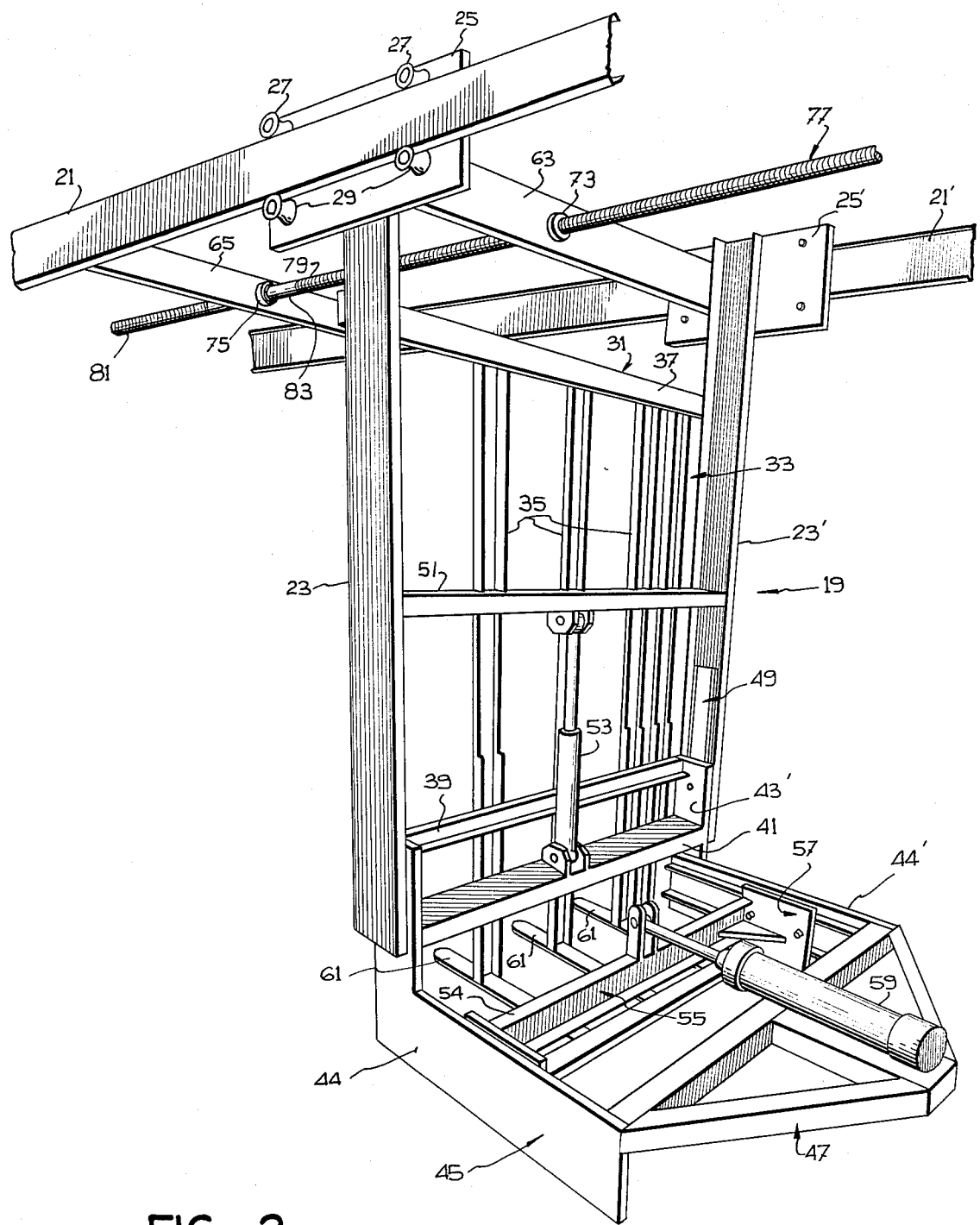
FIG. 2 is a perspective view of one side of the apparatus of FIG. 1, showing one of the load-lifting structures and wherein parts of the elevator bridge are removed, for clarity.

Referring to FIGS. 1 to 7, a load 1, made here of adjoining piles of cardboard blanks resting on a supporting cardboard sheet 3, is driven toward a roller conveyor 5 beneath an elevator bridge 7 at a pallet-loading station 9. The load 1 may be pushed by hand on an entry roller conveyor 11 of which the rollers may be freely rotatable on a frame 13. Alternatively, the rollers of the entry conveyor 11 may be powered by a sprocket and chain arrangement actuated by a suitable motor.

The roller conveyor 5, within the elevator bridge 7, is made up mainly of power-driven central rollers 17 (FIG. 3), spaced from one another, and may preferably have freely rotatable inlet rollers 15 and outlet rollers 15' leading into a discharge conveyor 18, rollers 15 and 15' being closely adjacent to one another like the rollers of the entry conveyor 11.

Two like cooperating load-lifting structures 19 (FIG. 2), one for each side of the roller conveyor 5, depend from a pair of runway beams 21, 21', and may be moved along them across the conveyor 5.

Each load lifting structure 19 thus comprises two vertical guides 23, 23', that are mounted at their upper ends on the runway beams 21, 21', by means of roller connectors formed of plates 25, 25', secured to the guides 23, 23', as by welding, provided with pairs of pulley-like upper rollers 27 and pulley-like lower rollers 29 respectively riding on the top and bottom pointed edges of the runway beams 21, 21'. Mounted for displacement between each pair of vertical guides 23, 23', is a load-lifting frame 31 that can thus be moved along the guides 23, 23', across the roller conveyor 5.

Each frame 31 comprises a vertical ram wall 33 made up of a series of spaced vertical channel members 35 interconnected by a top horizontal transverse brace 37 and two further lower transverse braces 39, 41. The latter braces are solid, at their ends, with the vertical arms 43, 43', of an L-shaped operating base frame 45 of which the horizontal arms 44, 44', or side members, are joined together at their free ends by a triangular brace structure 47. Slide means 49, of any known type, interconnect the upper ends of the arms 43, 43', and the adjacent vertical guides 23, 23', respectively. A further brace 51, free of the ram wall 33, is secured at its ends to the vertical guides 23, 23'. A power jack 53 is operatively mounted between the braces 41 and 51.

From the above description, it will be appreciated that actuation of the power jack 53 moves the load-lifting frame 31 (ram wall 33 and operating base frame 45 solid therewith) vertically along the guides 23, 23'.

Within the operating base frame 45 is a tine carrier 55 having a transverse bar 54 mounted at its ends, by conventional slide means 57, for displacement along the horizontal arms 44, 44', of the base frame 45. A power jack 59 joins the tine carrier transverse bar 54 and the triangular brace structure 47 thereby allowing, when actuated, displacement of the carrier 55 and tines independently of the ram wall 33. Tine carrier 55 moves also vertically, when the power jack 53 is operated, as part of the load-lifting frame 31 through its connection 57 with the base frame 45.

A plurality of horizontal tines 61 are solid, at one end, with the transverse bar 54 of the carrier 55. They are suitably spaced apart and located with respect to the roller conveyor 5 for insertion in spaces between the central rollers 17 of the said roller conveyor 5 (FIG. 3), when the power jack 59 is correspondingly actuated.

Power means are provided for displacing the two load-lifting structures 19 toward and away from one another and over the roller conveyor 5. For this purpose, each pair of vertical guides 23, 23', of the load lifting frames 31 is provided at the top with a horizontal transverse brace 63, one being shown in FIG. 2, solid with the guides 23, 23', and a similar horizontal transverse brace 65 likewise solidly interconnects the two runway beams 21, 21', at their centers while end horizontal braces 67, 67', (FIG. 1) solidly interconnect the ends of the beams 21, 21'. Thus, the two beams 21, 21', and the end braces 67, 67', form a rectangular frame at the top of the elevator bridge 7, divided in two by the central brace 65; the frame being supported by four corner posts 69, visible in FIG. 1. The latter posts are stiffened, in pairs, on each side of the conveyor 5, by pairs of diagonal braces 71.

The central brace 65, between the runway beams 21, 21', has a smooth-bore bearing 73 while each transverse brace 63 has a threaded-bore bearing 75. An actuating screw 77 extends across all the two bearings 73 and the central bearing 75. Screw 77 has two threaded portions 79, 81, of right and left threads, respectively; one portion threading through the threaded bore of the bearing 75, and the other through the threaded bore of the second bearing (not shown) of the transverse braces 63. These two threaded portions 79, 81, are separated by a central smooth portion 83 which journals in the smooth bore of the central bearing 73. FIG. 1 shows one end of the screw 77 being smooth and journalled in a bearing 85 and operatively connected to a motor 87 mounted on a supporting bracket 89 fixed to the adjacent brace 67. The other end of the screw 77 journals in a bearing (not shown) of the horizontal brace 67'. The screw is thereby mounted for rotation and means (not shown) are provided to avoid that it be displaceable linearly.

When motor 87 is energized, it drives the screw 77 into rotation and, by reason of the inverted threads of the two portions 79, 81, the load-lifting structures 19 are moved toward or away from one another, depending on the direction of rotation of the motor 87, above the roller conveyor 5.

Figure 3:
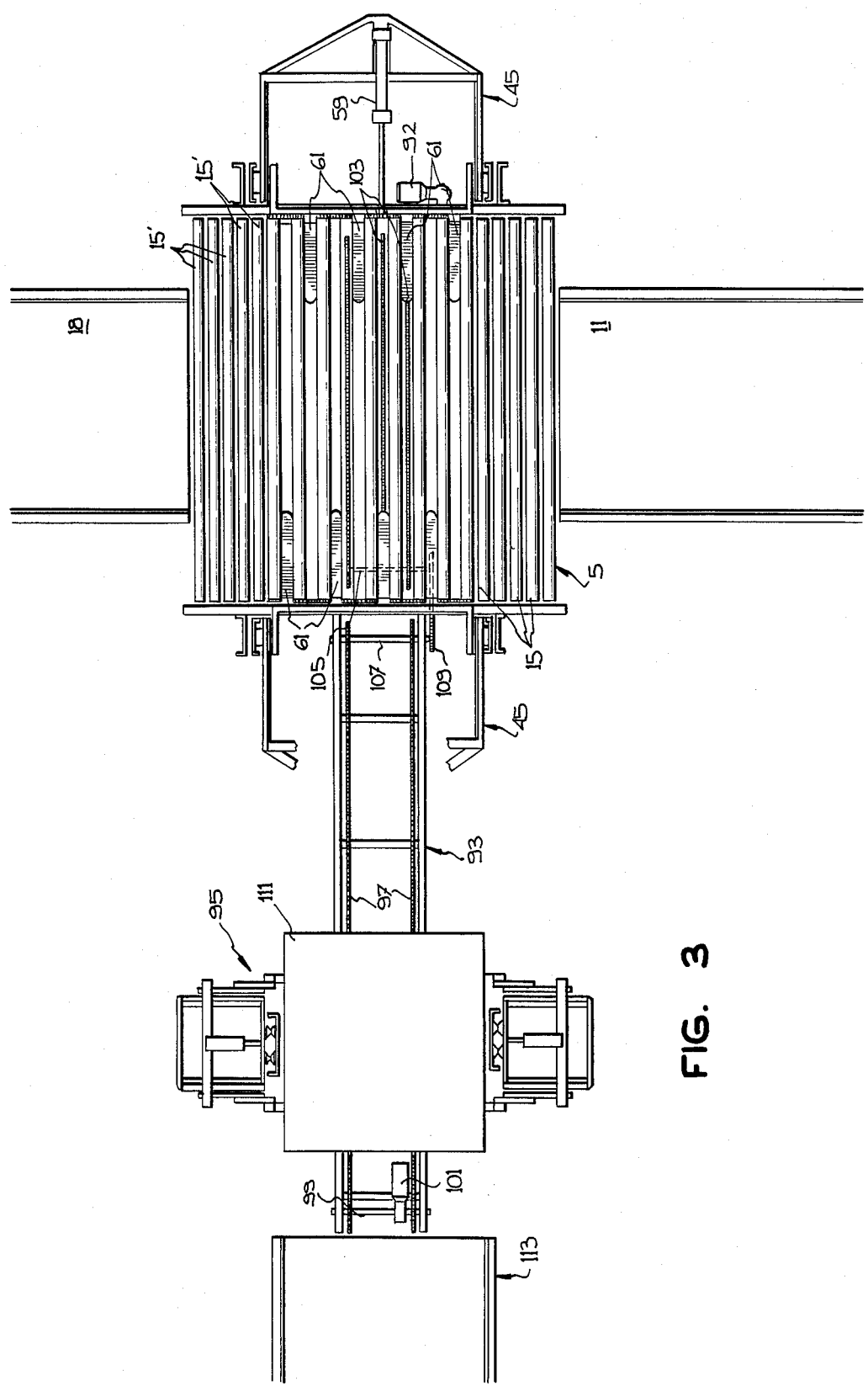
FIG. 3 is a top plan view of the apparatus of FIG. 1, the elevator bridge and load-lifting structures being removed almost entirely for clarity.
Figure 8:
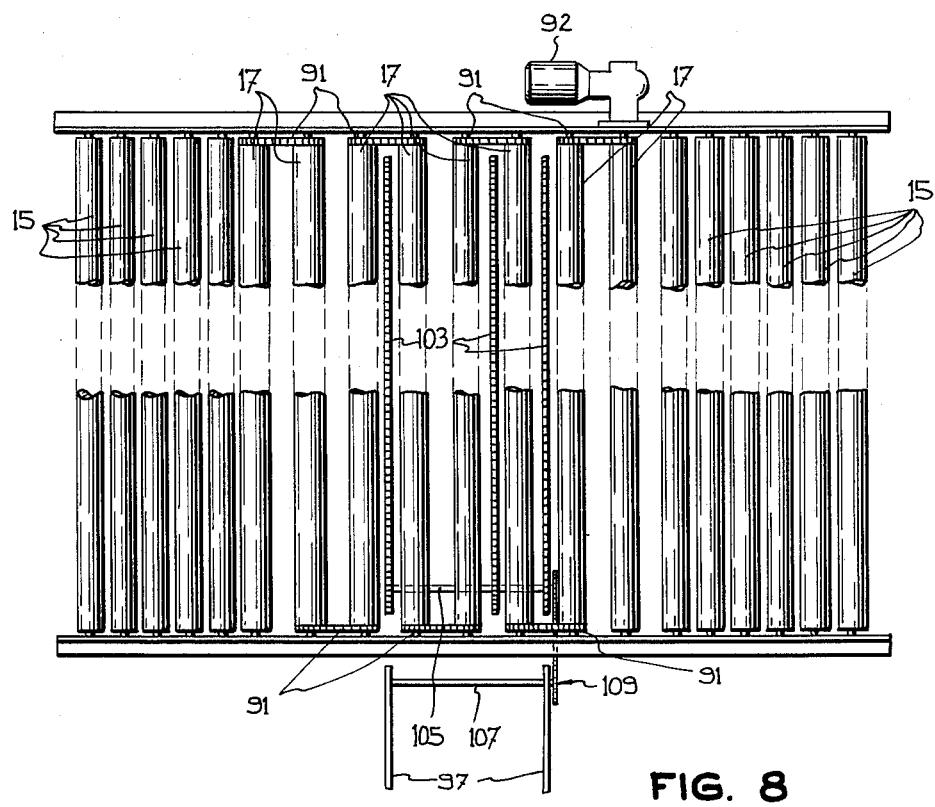
FIG. 8 is a top plan view of the roller conveyor, in the elevator bridge, and of the end of the pallet-feeding mechanism.
Figure 9:
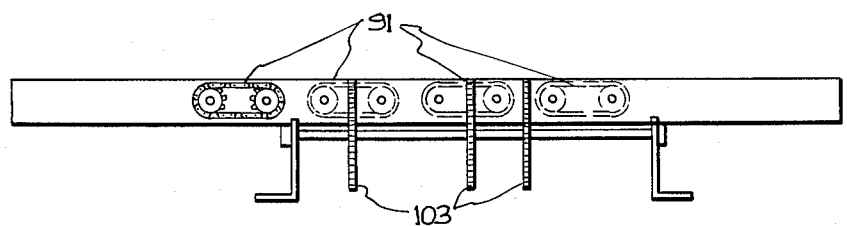
FIG. 9 is a side elevation diagrammatic view of the central part of the roller conveyor of FIG. 8.
Figure 10:
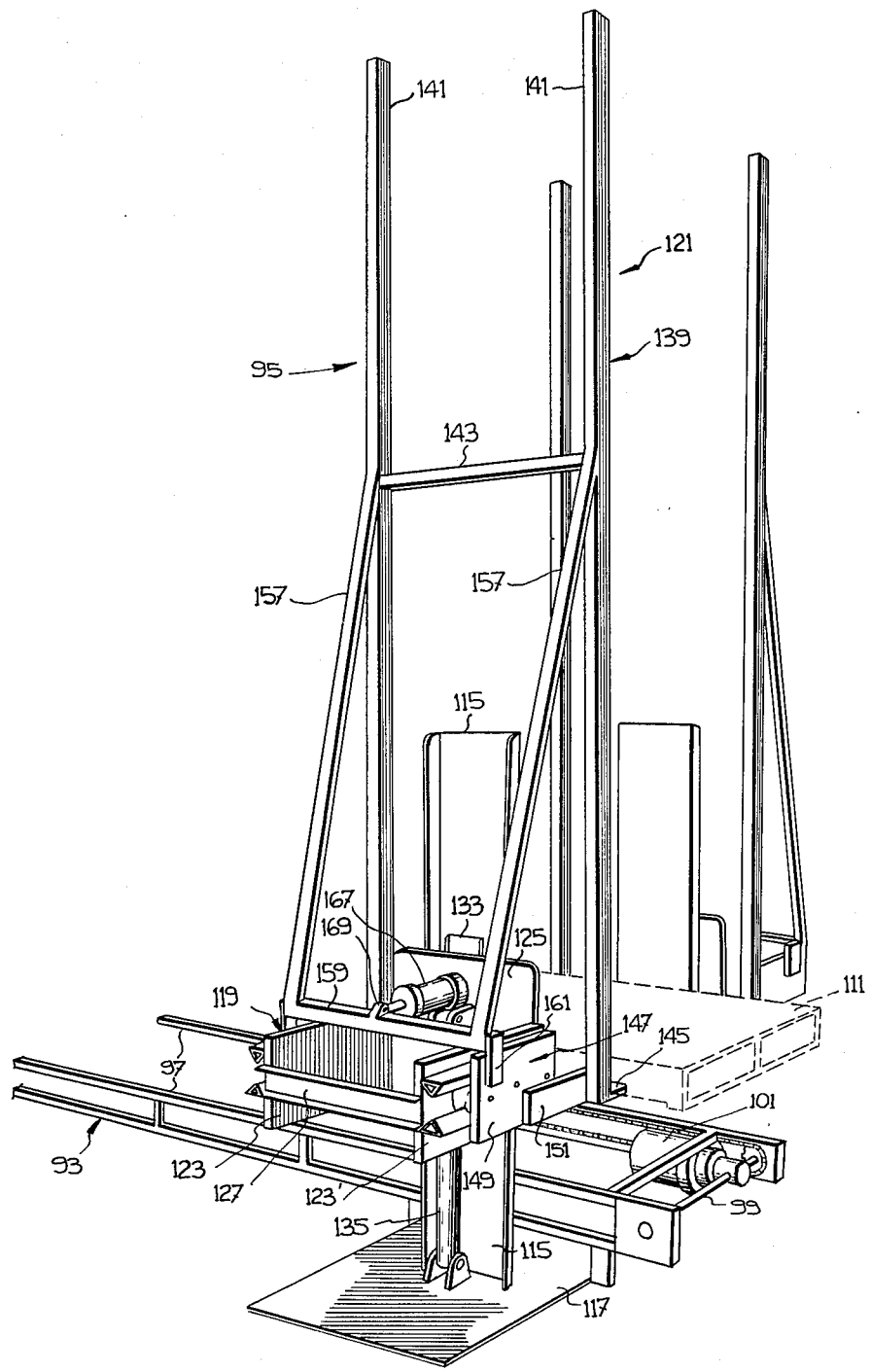
FIG. 10 is a perspective view of the pallet-unstacking mechanism of FIG. 1.
Figure 11:
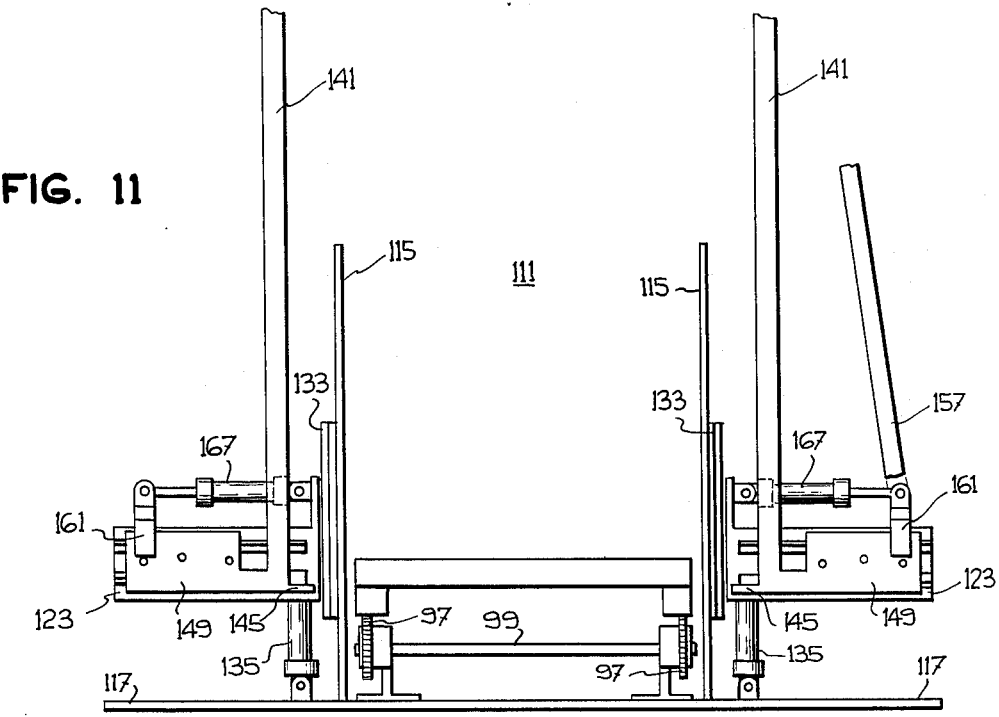
Figure 12:
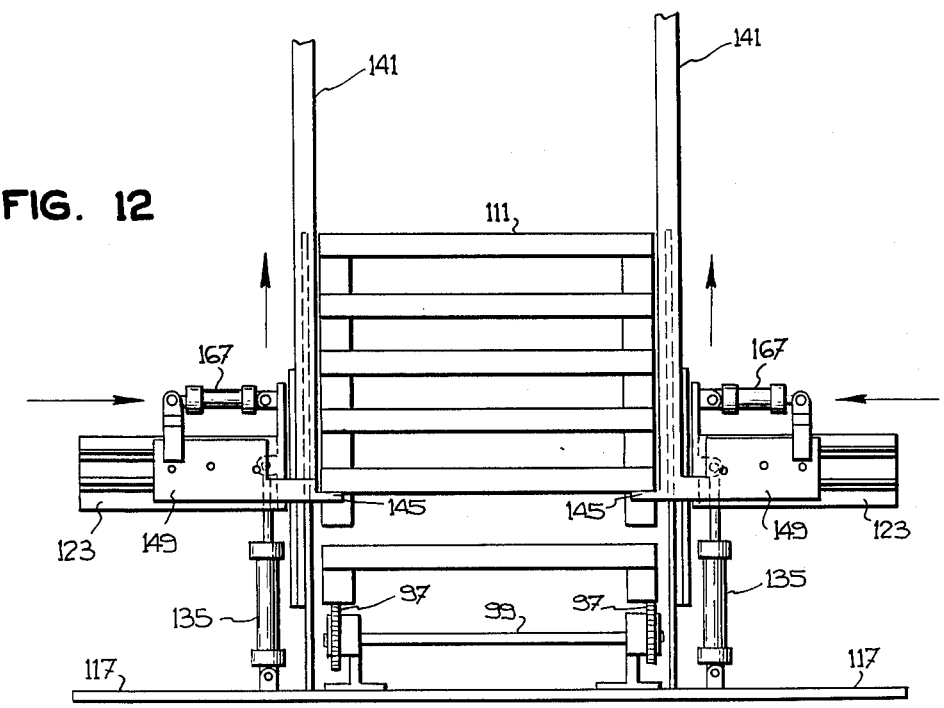
FIG. 12 shows it in operative position.

FIGS. 3, 8 and 9 show that the rollers 17 of conveyor 5 are interconnected by a chain drive mechanism formed of chain sections 91 including sprocket wheels secured to opposite ends of the roller shafts, the chain sections 91 being disposed in a staggered arrangement. The shaft of one of the rollers 17 is driven into rotation by a motor 92 thereby causing a rotation of all of the rollers 17.

Referring to FIG. 3, pallet feed means, provided laterally of and on one side of the conveyor 5, move the pallets 111 one at a time and when the lifting frames 31 and accompanying tines 61 are in raised position. The pallet-feed means comprise an endless conveyor 93, extending in a direction normal to the load-moving direction of the conveyor 5, and a pallet unstacking mechanism 95 delivering the pallets 111 one by one onto the endless conveyor 93.

The endless conveyor 93 is made up of a first section, having a pair of endless chains 97 of which one end sprocket-wheel shaft 99 is operatively coupled to a motor 101, and a second section having three endless chains 103 of which a common end sprocket-wheel shaft 105 is operatively coupled to the second end sprocket-wheel shaft 107 through a chain and sprocket connector 109. These two conveyor sections are of course mounted on suitable frames.

It will be noted that the three endless chains 103 of the second section each extends into a space between two adjacent rollers 17 of the conveyor 5, as do the tines 61. Additionally, the upper strands of the endless chains 103 project slightly above the conveyor rollers 17 so that the eventual pallet 111 may adequately be brought over, when unloaded, the rollers 17.

While the second section is shown to comprise three endless chains 103, it is of course to be understood that only two or more than three chains may be used.

As illustrated in FIG. 3, the stack of pallets 111 is brought over the pallet unstacking nechanism 95 by an entry conveyor 113 which may either be a chain conveyor or a roller conveyor.

The pallet unstacking mechanism 95 is detailed in FIGS. 10 through 15 and is made up of two like structures, one on either side of the conveyor 93. Only one such structure therefore need be described.

It comprises an upward stationary column 115 having one end secured to a floor pedestal, which may be a metal plate 117; column 115 serving to hold and guide a combination of a base 119 and of a pallet-retaining frame 121 in vertical displacement. Additionally, the frame 121 is mounted on the base 119 for horizontal displacement above the conveyor 93.

Figure 13:
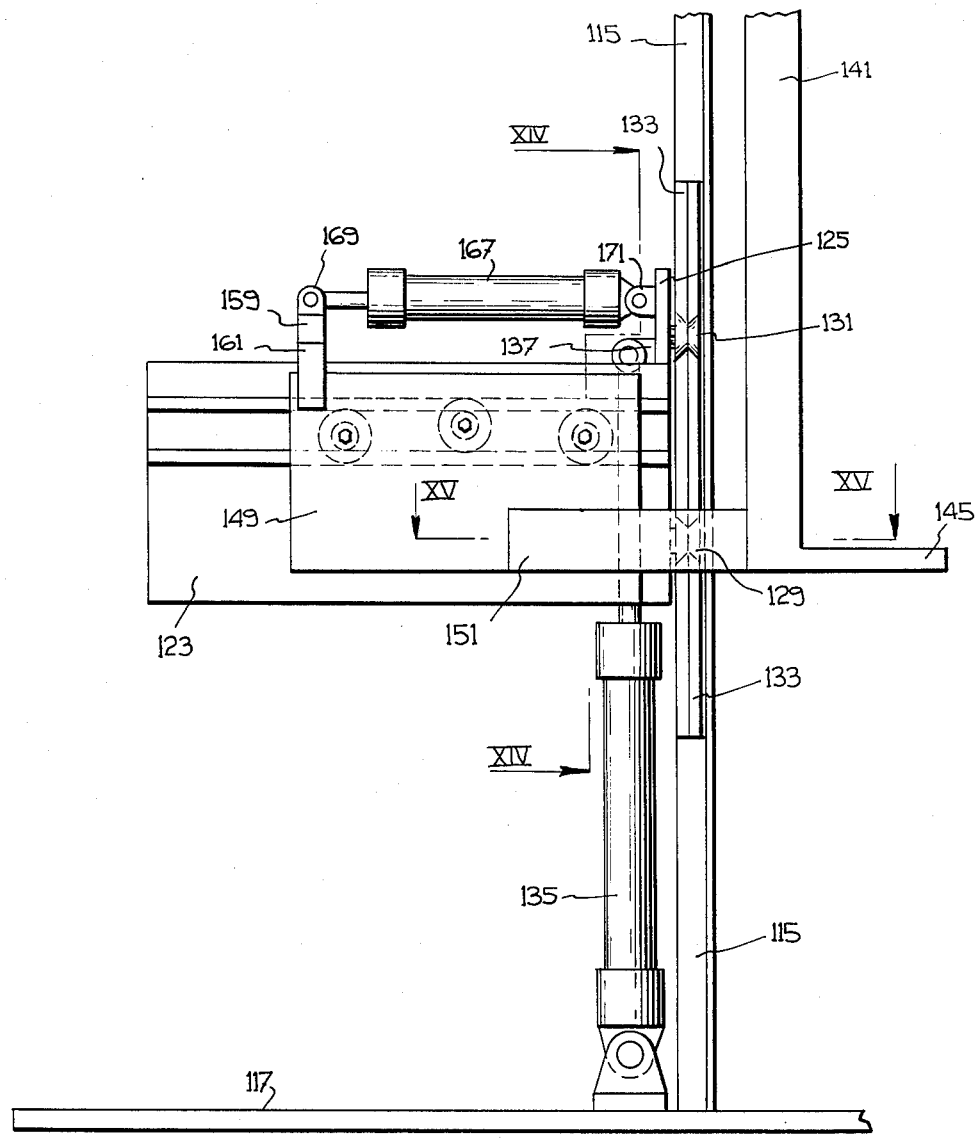
FIG. 13 is a side elevation view, on an enlarged scale and on one side only of the pallet feed conveyor, of the unstacking mechanism of FIGS. 10, 11 and 12.
Figure 15:
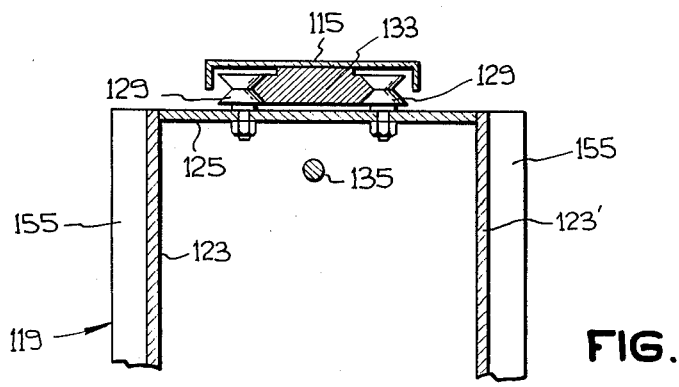

The base 119 is a frame having a pair of sidewalls 123, 123', connected by a front wall 125 and by a rear wall 127. Referring to FIGS. 13 and 15, it is seen that the front plate 125 has a pair of lower triangularly grooved rollers 129 and a pair of upper triangularly grooved rollers 131 riding along similarly triangular vertical edges of a rail 133 secured to the column 115. Vertical displacement of the base 119 is by means of a power jack 135 having its cylinder lower end mounted on the pedestal plate 117 and its rod upper end on a bracket 137 projecting rearwardly from the base front wall 125.

Figure 14:
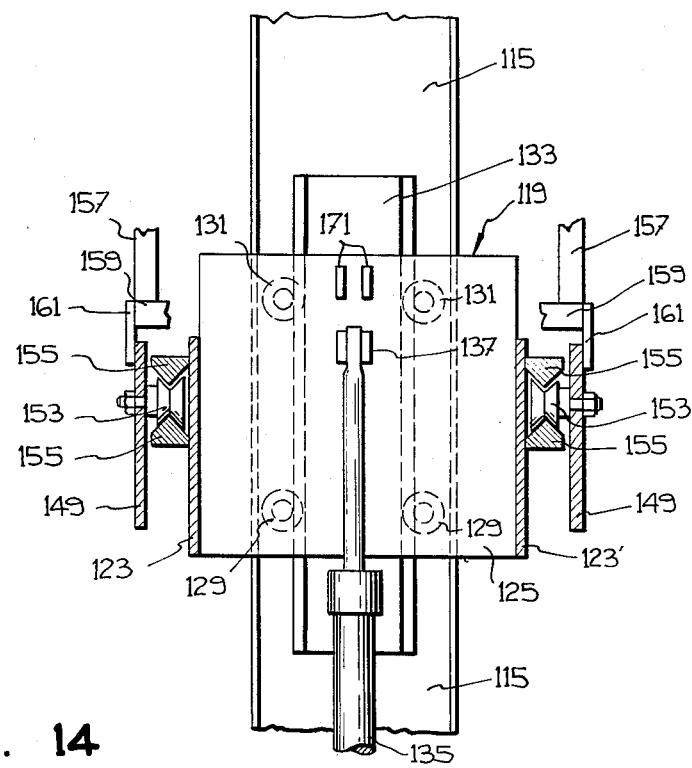
FIGS. 14 and 15 are cross-sectional views along lines XIV—XIV and XV—XV respectively of FIG. 13.

The pallet retaining frame 121 comprises a pallet grip portion 139 formed of a pair of vertical bars 141 stiffened at mid height by a brace 143 and at the top by a further brace 144 (FIG. 4); frame 121 further having short tines 145 at the lower ends of and extending at right angles from the bars 141, above the conveyor 93. Projecting rearwardly from and solid with the lower end of each bar 141 is also a guide portion 147 comprising a cheek plate 149 fixedly connected to the corresponding bar 141 by a short metal strap 151. The cheek plate 149, as best seen in FIG. 14, has a set of triangularly grooved rollers 153 mounted to roll on correspondingly triangular edges of a pair of guide rails 155 fast with the adjacent base sidewall 123 or 123'. Returning to FIG. 10, it is seen that two inclined brace bars 157 are secured, at their upper ends, to the vertical bars 141 and interconnected, at their lower ends, by a horizontal brace bar 159; the latter being in turn secured to the cheek plates 149 by short metal straps 161 as also clearly illustrated in FIG. 14. A power jack 167 (see particularly FIG. 13) is operatively inserted between a bracket 169 of the horizontal brace 159 and a similar bracket 171 secured to the rear face of the base front wall 125. Thus, operation of the power jack 167 allows horizontal displacement, with respect to the base 119, of the guide portion 147, of the pallet grip portion 139 and of the tines 145. When the power jack 135 is actuated, it causes vertical displacement of the base 119 as aforesaid, bringing along with it the pallet retaining frame 121 (pallet grip portion 139, guide portions 147 and tines 145).

Operation of the above described pallet loading apparatus can now be resumed as follows, reference being had particularly to FIGS. 4 through 7.

Figure 4:
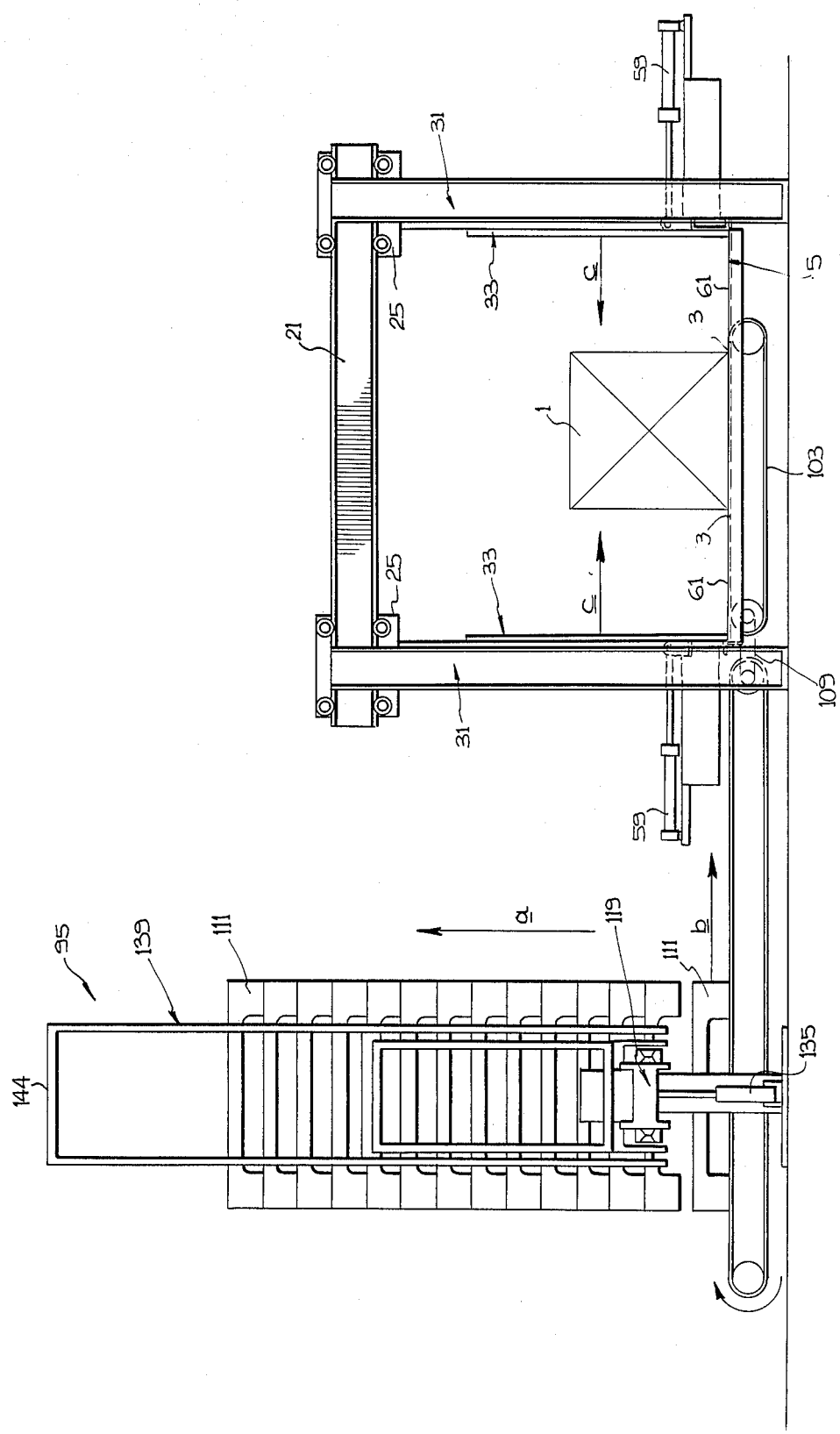
FIG. 4 is a front elevation view of the apparatus of FIG. 1 at the beginning of a cycle.
Figure 5:
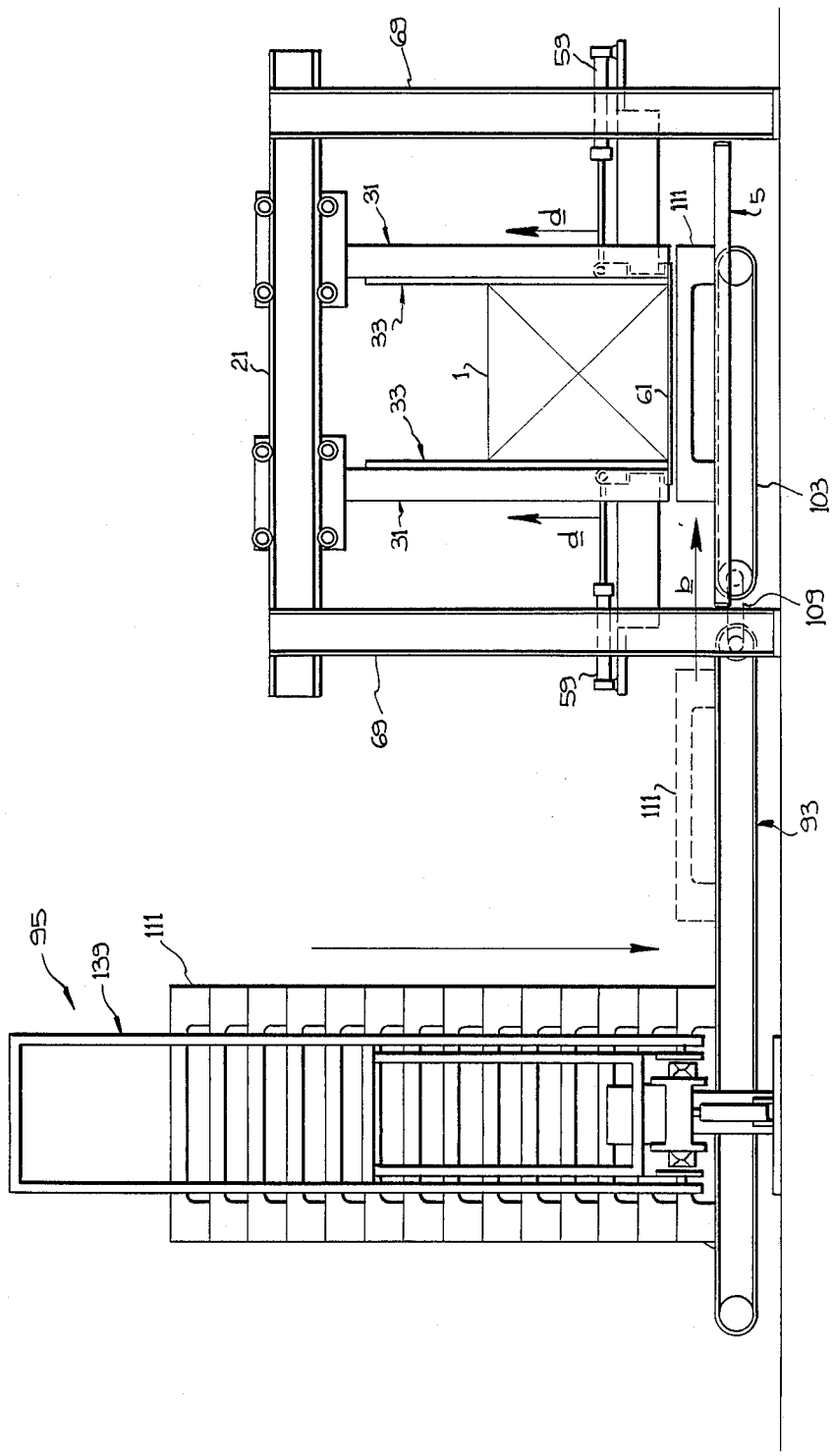
FIG. 5 is a view similar to that of FIG. 4 showing the load in raised position and a pallet having been shifted beneath it.
Figure 6:
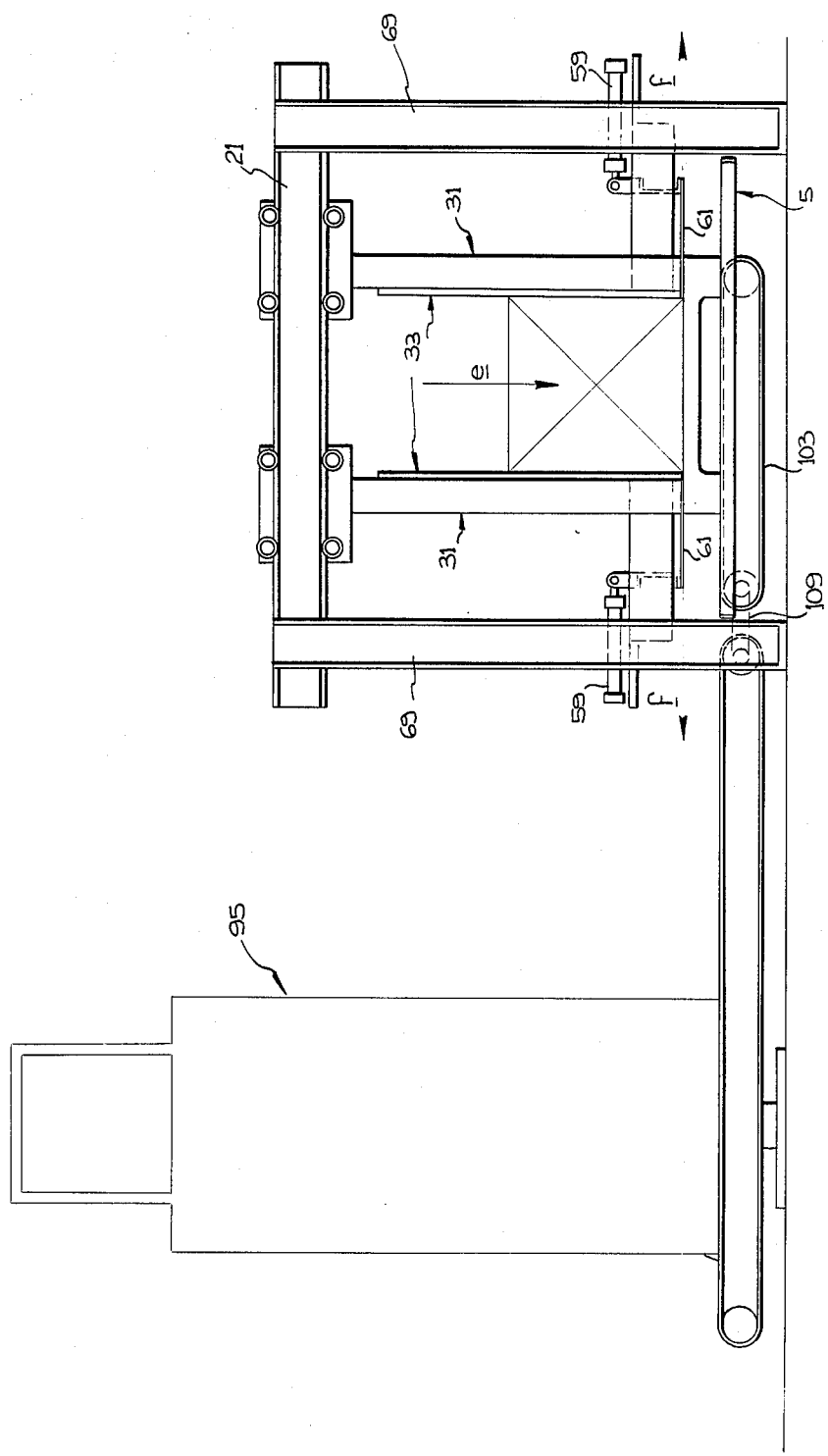
FIG. 6 is another view similar to that of FIG. 4, showing the load resting on the pallet and the lifting tines being removed.
Figure 7:
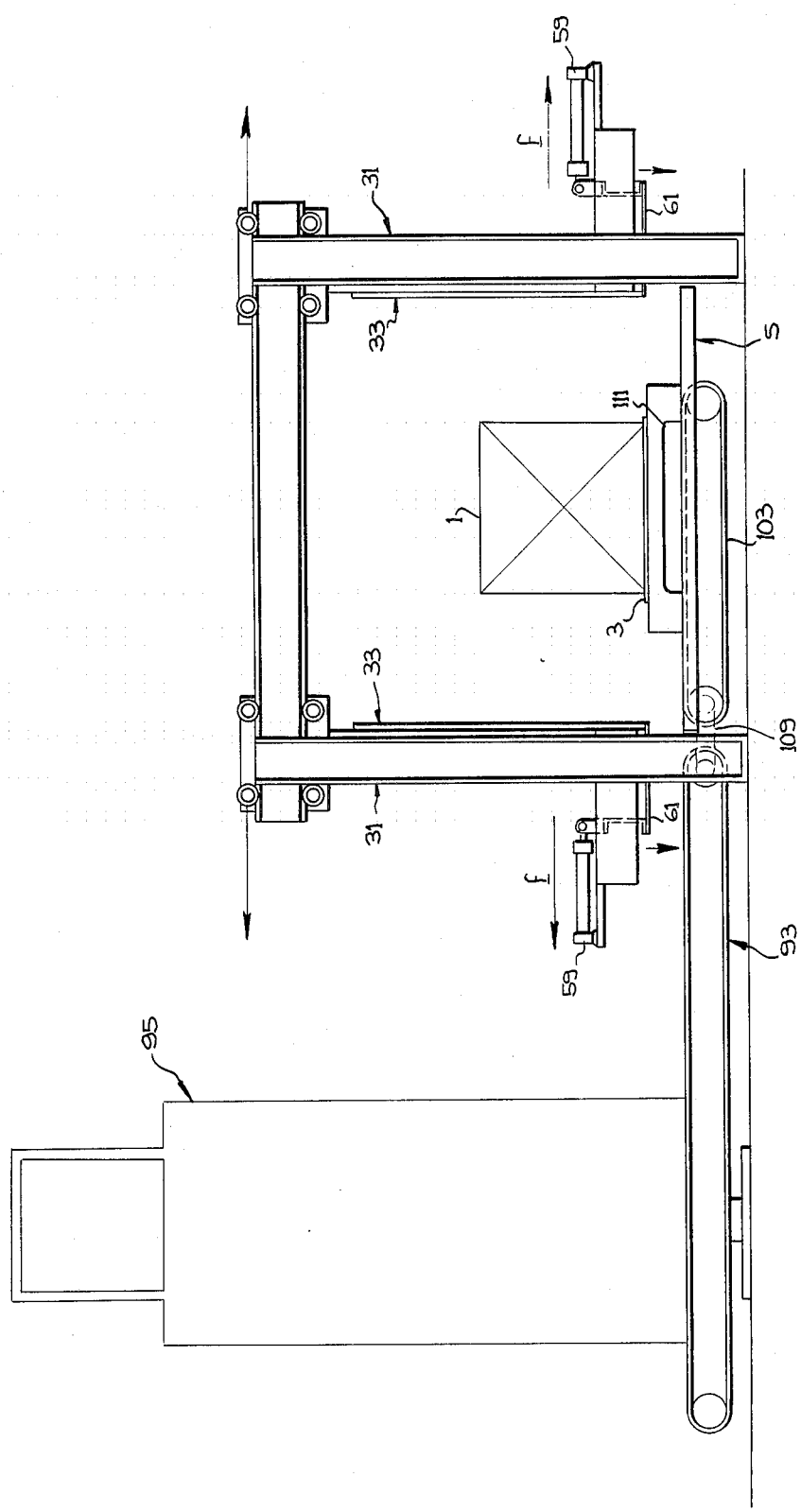
FIG. 7 is a further view similar to that of FIG. 4 with both the lifting tines and the ram walls moved away from the load.

In FIG. 4, the load 1 has been drawn over the roller conveyor 5 by the entry conveyor 11 followed by the freely rotatable rollers 15, then picked up by the power driven central rollers 17. When the load 1 is properly positioned, the motor 92 (FIG. 3) of the central rollers 17 is stopped. The lifting frames 31 and their ram walls 33 stand by the edges of the conveyor 5 and the jacks 59 have moved the tines 61 between the rollers 17.

One pallet 111 has been deposited on the conveyor 93 by the pallet unstacking mechanism 95. This has been done by placing the stack of pallets 111 on the conveyor 93; withdrawing the tines 145 from the lowest pallet by operating the power jack 167 (FIG. 10) to move them along with the pallet grip portions 139 laterally away from the conveyor 93 to free them; moving the base 119 up, following arrow a, along with the pallet grip portion 139 and tines 145, by operation of the jack 135 until the tines 145 are in position to be inserted in the following pallet above the lowest one; stopping the jack 135 and operating the jack 167 in reverse to insert the tines 145 in the said following pallet; and finally operating the jack 135 to raise a stack of pallets. The situation is then that of FIG. 4 and the lowest pallet 111 is ready to be moved on the conveyor 93 toward the loading apparatus, following the arrow b.

Electric motor 87 (FIG. 1) is then energized to rotate the screw 77 and move the two load-lifting frames 31 and ram walls 33 toward one another, along arrows c, causing the tines 61 to slip beneath the cardboard sheet 3 over which the load 1 is set. Movement of the frames 31 continues until the ram walls 33 come flat against the sides of the load 1 and straighten them, if need be, following which the electric motor 87 is shut down and the power jacks 53 (FIG. 2) operated to lift the load 1, resting on the tines 61, along arrow d in FIG. 5. The pallet 111 may then be shifted beneath the load 1 on the conveyor 5 by movement of the endless chains 103, along arrow b. Once in position, the endless chains 103 are stopped by shutting the electric motor 101 (left of FIG. 3) driving both conveyors 93 and 103. The load 1 may then be lowered onto the pallet 111 by working the power jacks 53 (FIG. 2) in reverse, this being illustrated by the arrow e in FIG. 6. With the ram walls 33 held tight against the load 1, the tines 61 are pulled back from under the load by working the jacks 59 in reverse and according to arrow f of FIG. 6. Once the tines 61 are fully retracted, the load-lifting frames 31 and ram walls 33 may be returned to their original position by the motor 87 rotating the screw 77 in reverse. The situation is then that shown in FIG. 7 and the pallet 111 with its load 1 may be moved away onto the discharge conveyor 18 (FIG. 3) by restarting the central portion of the roller conveyor 5.

While the motors and jacks can be manually separately operated to achieve the above described operations, it is of course within the skill of the art to provide a microprocessor for monitoring the operations, making the apparatus fully automatic.

I claim:

1. An apparatus for placing a load of stacked articles onto a pallet, comprising:
(a) a roller conveyor having a series of rotary parallel rollers, spaced from one another, for moving said load in a first direction extending transversely of said rollers;
(b) an elevator bridge comprising a pair of runway beams spaced from one another along said first direction and extending across said conveyor above the ends thereof;
(c) two like cooperating load-lifting structures depending from said runway beams, each lifting structure comprising:
two vertical guides spaced from one another along said first direction and means mounting the upper ends of said guides on said runway beams for movement of said guides across said conveyor;
a load lifting frame comprising:
vertical ram wall between said vertical guides and means mounting said ram wall on said vertical guides for movement along said guides;
power means for displacing said ram wall along said vertical guides;
a tine carrier comprising a plurality of horizontal load-gripping tines spaced horizontally from one another for insertion in spaces between said spaced rollers of said conveyor;
an operating base, solid with and at the lower end of said ram wall, and means mounting said tine carriers on said operating base for movement of said carrier and tines transversely of said roller conveyor;
power means on said operating base and on said tine carrier for displacing said tine carrier for moving said tines in said spaces between said conveyor rollers and for retracting said tines from said spaces;
(d) power means for displacing said load lifting structures across said roller conveyor to move said ram walls toward and away from one another, and
(e) pallet feed means, provided laterally of and on one side of said conveyor, for moving a pallet on said conveyor when said lifting frames and tines thereof are in raised position above said conveyor.

2. An apparatus as claimed in claim 1, wherein said pallet lateral feed means comprise:
(f) an endless conveyor extending in a direction normal to said first direction for feeding pallets onto said roller conveyor;
(g) a pallet unstacking mechanism comprising, on each side of said endless conveyor:
an upward stationary column;
a base and means mounting said base on said column, outwardly of said endless conveyor, for vertical sliding displacement of said base along said column;
a pallet-retaining frame comprising: a vertically standing pallet-gripping portion, horizontal pallet-gripping tines projecting over said endless conveyor, and a guide portion projecting laterally away from said endless conveyor; said tines and guide portion being solid with said pallet-gripping portion at the lower end thereof;
means mounting said guide portion on said base for horizontal guided displacement of said pallet-gripping portion with respect to said base;
power means on said pallet-retaining frame and on said base for causing said horizontal guided displacement of said pallet-gripping portion and of said tines over said endless conveyor;
means for vertically displacing said base, and hence said pallet-retaining frame, along said column, and wherein said endless conveyor comprises endless chains extending in spaces between some of said rollers of said roller conveyor with the upper strands of said endless chains projecting slightly above said conveyor rollers.

3. An apparatus as claimed in claim 2, wherein said means mounting the upper ends of said vertical guides on said runway beams are roller connectors comprising rollers mounted on said guides and riding on the upper and lower edges of said runway beams.

4. An apparatus as claimed in claim 3, wherein said power means for displacing said load-lifting structures across said roller conveyor comprise: transverse bars interconnecting the upper ends of said vertical guides; inwardly threaded bearings at the center of said bars; a driving screw extending across both of said bearings and having sections of reversed screw threads, one section threading through one of said bearings and the other section threading through the other of said bearings whereby rotation of said screw moves said load lifting frame in opposite directions, and motor means on said bridge structure for rotating said screw.

5. An apparatus as claimed in claim 2, wherein said ram wall comprises a plurality of horizontal transverse braces and said means mounting said ram wall on said vertical guides are slide means on said guides and at the ends of at least one of said transverse braces cooperating together to allow movement of said ram wall along said guides.

6. An apparatus as claimed in claim 5, further comprising: a horizontal transverse guide brace secured, at the ends thereof, to said vertical guides and said power means for displacing said ram wall along said vertical guides is a power jack connected respectively to said horizontal transverse guide brace and to one of said ram wall transverse braces.

7. An apparatus as claimed in claim 2, wherein said operating base is a frame having a pair of side members extending from and solid with said ram wall outwardly with respect to said roller conveyor; said tine carrier comprises a transverse bar extending between said base side members and said tine carrier mounting means are slide means at the ends of said transverse bar and on said operating base side members.

8. An apparatus as claimed in claim 7, wherein said frame has a rear transverse structure interconnecting said side members, and said power means moving said tine carrier is a power jack connected between said transverse bar of said tine carrier and said rear structure of said frame, respectively.

9. An apparatus as claimed in claim 2, further comprising a chain drive mechanism for rotating said rollers of said roller conveyor in unison.

10. An apparatus as claimed in claim 2, wherein said means mounting said guide portion of said pallet-retaining frame on said base of said unstacking mechanism are roller means.

11. An apparatus as claimed in claim 2, wherein each base of said pallet-unstacking mechanism is a frame having a pair of side walls and a front wall joining said side walls, said guide portions of said pallet-retaining frame being located outwardly of said frame side walls and comprising a horizontal brace secured, at the ends thereof, to said guide portions, and wherein said power means causing said horizontal displacement of said pallet-gripping portion is a power jack operatively mounted on and between said horizontal brace and said front wall, respectively.

12. An apparatus as claimed in claim 2, further comprising a floor pedestal and wherein said upward stationary column is secured to said pedestal and said means for vertically displacing each base of said pallet-unstacking mechanism are power jacks mounted respectively on said pedestal and bases.

* * * * *